United States Patent
Brusletto

(10) Patent No.: US 12,522,574 B2
(45) Date of Patent: Jan. 13, 2026

(54) PROCESS FOR THE PRODUCTION OF FURFURAL

(71) Applicant: Arbaflame Technology AS, Matrand (NO)

(72) Inventor: Rune Brusletto, Jar (NO)

(73) Assignee: ARBAFLAME TECHNOLOGY AS, Matrand (NO)

( * ) Notice: Subject to any disclaimer, the term of this patent is extended or adjusted under 35 U.S.C. 154(b) by 0 days.

(21) Appl. No.: 17/278,881

(22) PCT Filed: Sep. 23, 2019

(86) PCT No.: PCT/EP2019/075542
§ 371 (c)(1),
(2) Date: Mar. 23, 2021

(87) PCT Pub. No.: WO2020/064641
PCT Pub. Date: Apr. 2, 2020

(65) Prior Publication Data
US 2022/0048877 A1    Feb. 17, 2022

(30) Foreign Application Priority Data
Sep. 24, 2018   (EP) .................................... 18196303

(51) Int. Cl.
*C07D 307/50*  (2006.01)
*C10L 5/36*  (2006.01)

(52) U.S. Cl.
CPC ............ *C07D 307/50* (2013.01); *C10L 5/363* (2013.01)

(58) Field of Classification Search
CPC ............................ C07D 307/50; C10L 5/363
See application file for complete search history.

(56) References Cited

U.S. PATENT DOCUMENTS

| | | | |
|---|---|---|---|
| 2,862,008 A | 11/1958 | Gunnar et al. | |
| 2013/0172585 A1 | 7/2013 | Fergusson et al. | |
| 2014/0171664 A1* | 6/2014 | Burket | C07D 307/48 549/489 |
| 2018/0009774 A1* | 1/2018 | Izawa | C07D 307/48 |

FOREIGN PATENT DOCUMENTS

| | | | | |
|---|---|---|---|---|
| CA | 2949436 C | * | 5/2022 | .......... C07D 307/42 |
| CN | 107021878 A | | 8/2017 | |
| EP | 2537841 A1 | | 12/2012 | |
| EP | 3 184 518 A1 | | 6/2017 | |
| JP | S62-010078 A | | 1/1987 | |

(Continued)

OTHER PUBLICATIONS

International Search Report cited in PCT/EP2019/075542 dated Jan. 24, 2020, 5 pages.

(Continued)

*Primary Examiner* — Latosha Hines
(74) *Attorney, Agent, or Firm* — Rothwell, Figg, Ernst & Manbeck, P.C.

(57) ABSTRACT

The present invention refers to a method of producing furfural and optionally further basic chemicals from biomass material comprising treatment of the biomass material at elevated pressures and temperatures, to the condensates and solid product obtained by the method of the invention, as well as to their use.

20 Claims, 1 Drawing Sheet

(56) References Cited

FOREIGN PATENT DOCUMENTS

| | | |
|---|---|---|
| RU | 2 113 436 C1 | 6/1998 |
| SU | 878768 A1 | 11/1981 |
| WO | 89/010362 A1 | 11/1989 |
| WO | 00/47569 A1 | 8/2000 |
| WO | 00/63488 A1 | 10/2000 |
| WO | 2013025564 A2 | 2/2013 |
| WO | 2013/102000 A1 | 7/2013 |
| WO | 2013/102002 A1 | 7/2013 |

OTHER PUBLICATIONS

Extended European Search Report cited in EP 18196303.4 dated Feb. 27, 2019, 16 pages.
Notification of Reasons for Refusal for Japanese Patent Application No. 2021-516671 dated Sep. 25, 2023. (20 pp.) with English Translation.
Chinese Office Office and Search Report application No. 201980062526.3 dated Aug. 29, 2023, 26 pages.
Russian Officer Action issued in 2021111348 dated Sep. 11, 2023, 14 pgs.

\* cited by examiner

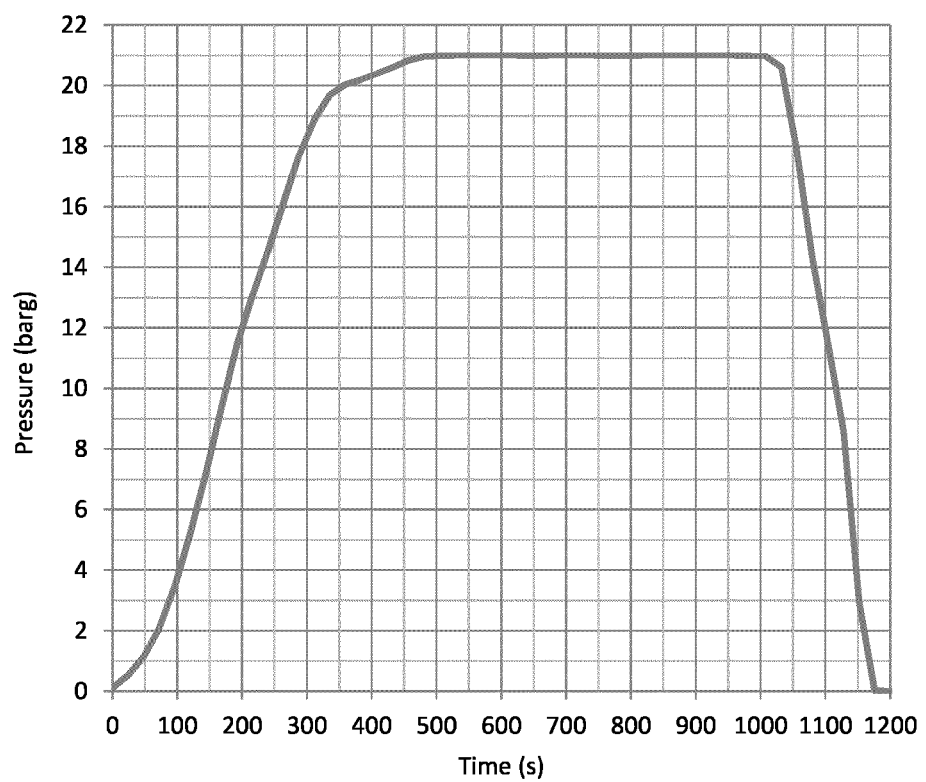

PROCESS FOR THE PRODUCTION OF FURFURAL

CROSS REFERENCE TO RELATED APPLICATION

This application is a 35 U.S.C. 371 National Phase Entry Application from PCT/EP2019/075542, filed Sep. 23, 2019, which claims the benefit of European Patent application Ser. No. 18/196,303.4 filed on Sep. 24, 2018, the disclosures of which are incorporated herein in their entirety by reference.

The present invention refers to a method of producing furfural and optionally further basic chemicals from biomass material comprising treatment of the biomass material at elevated pressures and temperatures, to the condensates and solid product obtained by the method of the invention, as well as to their use.

Natural and particularly renewable sources for raw materials are of great interest in view of the fast shrinking resources of fossil materials. A promising approach is therefore resorting to renewable biomass materials as starting material for the production of basic chemicals or fuels, which are required in great quantities.

A versatile basic chemical which can be produced from natural sources is furfural. Furfural is the starting point for important basic chemicals such as furan, tetrahydrofuran or furfuryl alcohol, and thus, forms the basis for many syntheses in the field of heterocyclics, drug and natural substance chemistry. Moreover, furan resins, which can be found in thermosetting composites, cements, adhesives and coatings, go back to furfural.

A common way to obtain furfural is the acid catalyzed dehydration of $C_5$ sugars. US 2014/0171664 discloses a process comprising repeating cycles of heating a mixture of lignocellulosic feedstock and sulfuric acid to a first predetermined temperature by pressurized steam and subsequent pressure and temperature reduction. Multiple reaction cycles, such as 6 to 8 cycles, are necessary to provide an acceptable yield of furfural.

WO 00/47569 discloses a process comprising heating of optionally acidified biomass material by pressurized steam and subsequent depressurization under continuous boiling of the reaction mixture. The furfural yield is increased by either permanent introduction of pressurized steam in the reactor, or by repeating cycles of pressurization and subsequent depressurization.

A great issue of the processes known in the art is the need of several process cycles in order to obtain acceptable yields of furfural. An increased number of reaction cycles usually causes a longer reaction time, higher energy consumption, increased material wear of the reactor due to constantly changing pressure loads and thus, significantly higher production costs.

An object of the present invention was therefore the provision of an improved method of producing furfural. Surprisingly, it was found that maintaining biomass material at elevated pressures and temperatures for a certain time span results in significantly increased product yields in shorter time. Besides, the process according to the invention requires less energy and makes minor demands of equipment by avoiding costly re-pressurization and re-heating steps. Moreover, the solid remainder of the reaction may be further processed to obtain additional basic chemicals or fuels, or may be used in combustion process, thus significantly extending the value chain of the biomass starting material.

BRIEF DESCRIPTION OF DRAWING

FIG. 1 illustrates a respective pressure/time profile.

DETAILED DESCRIPTION

The present invention relates to a method for producing furfural, comprising the steps of:
(i) providing biomass material in a reaction vessel,
(ii) adjusting the pressure in the reaction vessel to an elevated pressure $p_1$ and the temperature in the reaction vessel to an elevated temperature $T_1$,
(iii) maintaining the pressure $p_1$ and/or the temperature $T_1$ for a predetermined time span $t_1$,
(iv) adjusting the pressure in the reaction vessel to an elevated pressure $p_2$ and/or the temperature in the reaction vessel to an elevated temperature $T_2$,
(v) optionally maintaining the pressure $p_2$ and/or the temperature $T_2$ for a predetermined time span $t_2$,
(vi) opening the reaction vessel, and
(vii) optionally separating solid products from the reaction mixture present in the reaction vessel,
wherein the pressure $p_1$ is higher than the pressure $p_2$, and wherein a furfural containing vapor stream is withdrawn during steps (iii), (iv), (v) and/or (vi), and collected in the form of condensate.

In step (i), biomass material is provided in a reaction vessel. The biomass material may comprise biological material such as plants or plant-derived material, e.g. processed products, by-products, residues or waste products from biomass materials. The biomass material may comprise a mixture of different types of biomass or may be a single type of biomass. The biomass material can be fresh biomass, i.e. biomass including at least a part of the naturally contained water, dry biomass, or a mixture thereof. The biomass material may derive from lignocellulosic material and/or algae, and is in particular selected from wood, straw, sawdust, corn cobs, corn husks, corn stover, grass, cotton hulls, switchgrass, Arundo Donax, waste paper, sugar cane bagasse, sorghum, sorghum stalk residue, palm fruit bunches, or mixtures thereof. In a preferred embodiment, the biomass material does not contain monosaccharides and/or oligosaccharides, e.g. having 2-10 monosaccharide monomeric units.

The rest moisture of the biomass material may be at least 20 wt.-%, such as about 30-80 wt.-%, preferably about 30-40 wt.-%, and in particular about 35 wt.-%.

The reaction vessel is configured with an inlet, e.g. for steam under pressure, and an outlet e.g. for vapor stream, the inlet and outlet including one or more valves for controlling the pressure within the reactor. Further, the reaction vessel may have a bottom valve for discharging the vessel content.

In one embodiment, the method according to the invention is performed without catalysis. In another embodiment, step (i) further comprises providing a catalyst in the reaction vessel. The catalyst may be selected from acidic compounds such as sulfuric acid, hydrochloric acid, phosphoric acid, organic acids such as acetic acid or formic acid, and mixtures thereof, and/or from halide salts such as metal chlorides. The halide salts may originally occur in the biomass material as a consequence of its production, transportation or pretreatment. The catalyst may preferably be selected from hydrochloric acid and sulfuric acid. In a preferred embodiment, the acidic compound is provided in solution. The catalyst may be present in a concentration of up to 5 mol/kg dry biomass materials, preferably 0.01-5 mol/kg, more preferably 0.1-2 mol/kg, dry biomass material.

The method according to the invention may be performed in the presence of oxygen, gases comprising oxygen, oxygen donors and mixtures thereof, particularly preferred are oxygen and gases comprising oxygen, such as (compressed) air. "Oxygen donors" may be compounds which release oxygen ($O_2$) after chemical or thermal treatment, such as peroxides, particularly hydrogen peroxide or aqueous solutions thereof. Preferably, the method of the invention may be carried out in the presence of oxygen derived from air.

The method of the present invention is preferably carried out at a concentration of $O_2$ or $O_2$ equivalents in the range of 0.01-0.50 mol/kg of dried biomass material, preferably in the range 0.05-0.30 mol/kg of dried biomass material. "$O_2$ equivalent" means the theoretical amount of $O_2$ deriving from $O_2$ donors.

In step (ii) the pressure in the reaction vessel is adjusted to an elevated pressure $p_1$ and the temperature in the reaction vessel is adjusted to an elevated temperature $T_1$. The predetermined pressure $p_1$ may be >1 bar, such as in the range of from 2-50 bar, preferably from 10-30 bar, more preferably from 15-25 bar, and most preferably from 19-21 bar. Pressure adjustment is performed with a rate of e.g. 1-15 bar/min and preferably 2-7 bar/min.

The temperature $T_1$ is above ambient temperature (i.e. above 20° C.) and preferably ranges from 150° C. to 280° C., more preferably from 180° C. to 230° C. Adjusting the pressure and the temperature in the reaction vessel in step (ii) may comprise introducing pressurized steam in the reaction vessel. The amount of pressurized steam introduced in the vessel depends on the particular reaction conditions such as the predetermined temperature $T_1$, the predetermined pressure $p_1$, the amount and type of biomass material in the reaction vessel or the rest moisture of the provided biomass.

"Adjusting" or "adjustment" in the sense of the present invention means actively controlling certain parameters, such as pressure, time and/or temperature.

In step (iii) the pressure $p_1$ and/or the temperature $T_1$ is maintained for a predetermined time span $t_1$. In one embodiment the pressure $p_1$ is maintained for a predetermined time span $t_1$. In another embodiment the temperature $T_1$ is maintained for a predetermined time span $t_1$. In still another embodiment, both, the pressure $p_1$ and the temperature $T_1$ are maintained for a predetermined time span $t_1$. In a preferred embodiment, the pressure $p_1$ and optionally the temperature $T_1$ are maintained for a predetermined time span $t_1$. The predetermined time span $t_1$ is e.g. up to 1,800 s, preferably 1-1,800 s, more preferably 1-1,000 s, even more preferably 100-700 s and most preferably 500-700 s.

It was found that side reactions can occur in step (iii) particularly when performed in the presence of oxygen. Side reactions of the biomass material enable the endogenous maintenance of the pressure $p_1$ and/or the temperature $T_1$ in the reaction vessel without affecting the reaction yield. By this means, no additional energy supply e.g. in the form of additionally introduced pressurized steam, external heating of the reaction vessel or repeating of the reaction cycle, is necessary. Thus, preferably, no additional internal or external heating of the reactor, such as introduction of pressurized steam into the reaction vessel, is performed in step (iii).

Maintaining the pressure and/or the temperature in step (iii) can comprise withdrawing a vapor stream from the reaction vessel. The vapor stream comprising furfural can be collected in the form of a condensate.

Contrary to the prior art teaching, which observed yield losses due to reactions between furfural and xylose comprised in the starting material, it was found that maintaining the pressure and/or temperature in step (iii) according to the present invention surprisingly results in an improved reaction yield. Surprisingly, there was no need to perform more than one reaction cycle in order to achieve maximum reaction yields of furfural.

Thus, an improved method of producing furfural is provided herein, concerning e.g. reduced overall energy consumption, reduced reaction time, increased yields of furfural and a strongly reduced material wear of the reactor, as the reaction may already be completed in a single reaction cycle.

In step (iv) the pressure in the reaction vessel is adjusted to an elevated pressure $p_2$ and/or the temperature in the reaction vessel is adjusted to an elevated temperature $T_2$. In a preferred embodiment, the pressure in the reaction vessel is adjusted to a predetermined pressure $p_2$, wherein the pressure $p_1$ is higher than the pressure $p_2$. The pressure $p_2$ is in the range of from >1 to 50 bar, preferably from 2-30 bar, more preferably from 5-15 bar, and most preferably about 9 bar. Adjusting the pressure in the reaction vessel to $p_2$ may be performed with a rate of 1-15 bar/min, preferably 5-10 bar/min, and is e.g. performed by withdrawing of vapor stream from the reaction vessel.

In another embodiment, the temperature in the reaction vessel is adjusted to an elevated temperature $T_2$, wherein the temperature $T_1$ is higher than the temperature $T_2$. The temperature $T_2$ is above ambient temperature (i.e. above 20° C.) and preferably ranges from 100° C. to 250° C., more preferably from 150° C. to 200° C.

In still another embodiment the pressure in the reaction vessel is adjusted to an elevated pressure $p_2$, wherein the pressure $p_1$ is higher than the pressure $p_2$, and the temperature in the reaction vessel is adjusted to an elevated temperature $T_2$, wherein the temperature $T_1$ is higher than the temperature $T_2$. Adjusting the pressure and/or the temperature in step (iv) can comprise withdrawing a vapor stream comprising furfural from the reaction vessel. The vapor stream can be collected in the form of a condensate.

In optional step (v) the pressure $p_2$ and/or the temperature $T_2$ is maintained for a predetermined time span $t_2$. The time span $t_2$ is up to 800 s, preferably 1-800 s, more preferably 10-500 s, even more preferably 50-250 s and most preferably about 100 s. Maintaining the pressure $p_2$ and/or the temperature $T_2$ for a predetermined time span $t_2$ may comprise withdrawing a vapor stream comprising furfural from the reaction vessel. The vapor stream can be collected in the form of a condensate.

Optionally, steps (ii)-(v) can be repeated several times, such as 1-10 times, prior to opening of the reaction vessel in step (vi).

Opening of the reaction vessel in step (vi) may be controlled to depressurize the reaction vessel with a rate of e.g. 10-100 bar/min, preferably 40-70 bar/min. During opening of the reaction vessel a vapor stream comprising furfural is withdrawn from the reaction vessel, which can be collected, e.g. in the form of a condensate.

In optional step (vii) solid products are separated from the reaction mixture present in the reaction vessel. The rest moisture of the solid products can range from about 30-95 wt.-%, preferably from about 35-45 wt.-%, and is in particular about 40 wt.-%. The solid products exhibit a substantially complete conversion of initially contained pentose sugars into lower-molecular weight compounds, such as furfural. A substantially complete conversion in the sense of the present application corresponds to a reduction of the total pentose sugar content of at least 50%, preferably at least 60%, more preferably at least 70%. The solid products can have a concentration of pentose, such as arabinose and xylose, in the range of 0-2 wt.-%, preferably 0-0.5 wt.-% with regard to the dry solid product. A low pentose concentration in the solid products gives further proof of the improved reaction yield according to the present invention.

The vapor stream comprising furfural, which is withdrawn during steps (iii), (iv), (v) and/or (vi), can be collected in the form of a condensate, e.g. by using a cold trap. Compounds of interest comprised in the condensate such as aldehydes, ketones, organic acids, alcohols, or mixtures thereof, in particular furfural, acetic acid, methanol and/or acetone, can be isolated from the condensate by common methods known in the art, such as distillation, in particular fractional distillation, more particularly heat-pump or mechanical vapour recompression assisted distillation. Optionally, the isolated organic compounds are subjected to at least one subsequent purification step.

A further aspect of the present invention refers to a condensate obtainable according to the method disclosed above. The condensate comprises at least one organic compound selected from aldehydes, ketones, organic acids, alcohols, or mixtures thereof, in particular furfural, acetic acid, methanol and/or acetone. The amount of furfural comprised in the condensate may e.g. be about 0.5-7%, preferably about 1.5-5%

A further aspect of the present invention refers to the use of the condensate disclosed above for the production of basic chemicals such as aldehydes, ketones, organic acids, or alcohols, in particular for the production of furfural, acetic acid, methanol and/or acetone. The production of basic chemicals such as furfural can be performed by distillation such as fractional distillation, more particularly heat-pump or mechanical vapour recompression assisted distillation.

Moreover, the present invention refers to a solid product obtainable from step (vii) according to the method disclosed above. The solid product particularly has a low concentration of pentose sugars such as arabinose and xylose, corresponding to a reduction of the initial pentose sugar content by at least 50%, preferably at least 60%, more preferably at least 70% as compared to the biomass material used in step (i). The concentration of pentose in the solid product can be in the range of 0-2 wt.-%, preferably of 0-0.5 wt. % with regard to the dry solid product. The rest moisture of the solid product according to the invention can be about 30-95 wt.-%, preferably of 35-45 wt.-%, and most preferably about 40 wt.-%.

Further, the present invention refers to the use of the solid product of the invention for the preparation of pellets and to the pellets themselves. The preparation of pellets can be performed by conventional methods, such as extrusion, optionally using extrusion acids, such as lubricants, e.g. waxes, polymers, etc. Optionally, the preparation of pellets comprises a post-drying step. Effluent, which is received during the preparation of pellets, may comprise desirable organic compounds such as furfural. Thus, a further aspect of the present invention refers to the use of the solid product disclosed above for the preparation of basic chemicals and/or fuels. Moreover, the solid product and the pellets according to the invention can be used in combustion processes, e.g. in domestic or industrial combustion processes.

The present invention shall be further illustrated in more detail but not limited by the following examples.

EXAMPLE 1

An empty reaction vessel (about 12 m$^3$) was loaded with about 1200 kg of sawdust mainly deriving from spruce. The residual moisture in the sawdust was determined to be about 33 wt.-%.

The reactor was sealed and pressurized steam was introduced for about 350 s through the inlet until a pressure of about 20 bar was reached. Then, the steam inlet valve was closed and the internal pressure of the reaction vessel was allowed to further increase to the predetermined pressure $p_1$ of 21 bar which was reached after about 150 seconds. Then, a pressure-regulating valve was partially opened in order to maintain the predetermined pressure $p_1$ for about 500 s. Furfural containing vapour emerging from the reaction vessel was condensed and collected. Afterwards, the pressure-regulating valve was completely opened to adjust the pressure of the reaction vessel to $p_2$=9 bar in a time of about 100 s. Again, furfural containing vapour emerging from the reactor was condensed and collected. Finally, the outlet valve of the reaction vessel was opened and thereby emerging furfural containing vapour from the reactor was condensed and collected. The reactor was discharged into a flash tank wherein solid products from the reaction mixture were collected. A respective pressure/time profile is shown in FIG. 1.

The solid products, having a moisture content of about 38%, were post-dried to a moisture content of about 5% and used for the manufacturing of brown pellets. Post-drying effluent, containing small amounts of furfural, was condensed and collected. The unified condensates are subjected to chemicals separation and purification.

The total amount of condensate collected throughout the above process was roughly 50 wt.-% of the final solid products (on dry weight basis) and contained about 24 g of furfural per litre of condensate. The condensate was used for subsequent furfural separation and purification.

Examples 2-4

Examples 2-4 according to the invention were performed according to example 1, except that:

the time $t_1$ was 700 s (Example 2);

the pressure $p_1$ was 19 bar (Example 3);

the pressure $p_1$ was 19 bar and the time $t_1$ was 700 s (Example 4);

Comparative Example 5

Comparative example 5 was performed according to example 1, except that—after a pressure of 21 bar was reached—no maintaining step was performed ($t_1$=0 s), but the pressure in the reaction vessel was directly adjusted to 9 bar.

The total amount of condensate collected throughout the comparative process was roughly 50 wt.-% of the final solids (on dry weight basis) and contained about 10 g of furfural per litre of condensate.

Analysis

The carbohydrate composition of the initial biomass material as well as of the post-dried final solid products obtained according to Examples 1-5 was analyzed using ion chromatography with pulsed amperometric detection (IC-PAD). The results are displayed in table 1.

TABLE 1

IC-PAD analysis of the biomass and final solid product carbohydrate composition. The specific carbohydrate contents are expressed with regard to the total carbohydrate content set as 100 wt.-%.

| Example | $p_1$ | $t_1$ | $p_2$ | arabinose (wt.-%) | galactose (wt.-%) | glucose (wt.-%) | xylose (wt.-%) | mannose (wt.-%) |
|---|---|---|---|---|---|---|---|---|
| biomass material | — | — | — | 1.5 | 2.8 | 70.8 | 7.9 | 16.9 |
| 1 | 21 | 500 | 9.0 | 0.1 | 1.0 | 89.5 | 2.9 | 6.5 |
| 2 | 21 | 700 | 9.0 | <0.1 | 0.8 | 92.5 | 2.3 | 4.4 |
| 3 | 19 | 500 | 9.0 | 0.2 | 1.6 | 84.3 | 3.8 | 10.2 |
| 4 | 19 | 700 | 9.0 | 0.1 | 1.0 | 89.3 | 2.9 | 6.6 |
| 5 | 21 | 0 | 9.0 | 0.6 | 2.6 | 74.6 | 6.6 | 15.6 |

Both, the experimental yield of furfural obtained and the IC-PAD analysis of the remaining solid product clearly show that the method according to the invention provides an improved conversion of pentose sugars such as arabinose and xylose comprised in the biomass starting material to furfural when compared to state of the art methods lacking a step of maintaining the pressure in the reaction vessel constant for a predetermined time span.

The invention claimed is:

1. A method of producing furfural, comprising the steps of:
   (i) providing (a) biomass material and (b) oxygen or oxygen donors at a concentration of 0.01-0.50 mol $O_2$ or $O_2$ equivalents per kg of dried biomass material in a reaction vessel,
   (ii) adjusting the pressure in the reaction vessel to an elevated pressure $p_1$ and the temperature in the reaction vessel to an elevated temperature $T_1$, wherein the pressure $p_1$ is >1 bar and, the temperature $T_1$ ranges from 150° C. to 280° C.,
   (iii) endogenously maintaining the pressure $p_1$ and/or the temperature $T_1$ for a predetermined time span $t_1$, wherein the predetermined time span $t_1$ is 500-700 s,
   (iv) adjusting the pressure in the reaction vessel to an elevated pressure $p_2$ and/or the temperature in the reaction vessel to an elevated temperature $T_2$, wherein adjusting the pressure in the reaction vessel to the elevated pressure $p_2$ is performed with a rate of 1-15 bar/min, the pressure $p_2$ is in the range of from >1 to 50 bar, and the temperature $T_2$ ranges from 100° C. to 250° C.,
   (v) optionally maintaining the pressure $p_2$ and/or the temperature $T_2$ for a predetermined time span $t_2$, wherein the pressure $p_1$ is higher than the pressure $p_2$,
   (vi) opening the reaction vessel, wherein opening of the reaction vessel in step (vi) is controlled to depressurize the reaction vessel with a rate of 40-100 bar/min, and
   (vii) optionally separating solid products from the reaction mixture present in the reaction vessel,
   wherein the furfural is produced in the presence of the oxygen or oxygen donors,
   and
   wherein a furfural containing vapor stream is withdrawn during steps (iii), (iv), (v) and/or (vi) and collected in the form of condensates.

2. The method according to claim 1, wherein the biomass material derives from lignocellulosic material and/or algae.

3. The method according to claim 2, wherein the lignocellulosic material is wood, straw, sawdust, corn cobs, corn husks, corn stover, grass, cotton hulls, switchgrass, *Arundo Donax*, waste paper, sugar cane bagasse, sorghum, sorghum stalk residue, palm fruit bunches, or mixtures thereof.

4. The method according to claim 1, wherein step (i) further comprises providing a catalyst in the reaction vessel.

5. The method according to claim 4, wherein the catalyst is selected from acidic compounds such as sulfuric acid, hydrochloric acid, phosphoric acid, organic acids such as acetic acid or formic acid, and mixtures thereof, and/or from halide salts such as metal chlorides.

6. The method according to claim 4, wherein the catalyst is present in a concentration of up to 5 mol/kg dry biomass materials.

7. The method according to claim 1, wherein step (ii) comprises introducing pressurized steam in the reaction vessel.

8. The method according to claim 7, wherein no additional internal or external heating of the reactor, such as introduction of pressurized steam into the reaction vessel, is performed in step (iii).

9. The method according to claim 1, wherein the predetermined time span $t_2$ is 0-800 s.

10. The method according to claim 1, wherein adjusting the pressure in the reaction vessel to $p_2$ is performed with a rate of 1-15 bar/min.

11. The method according to claim 1, wherein the steps (ii)-(v) are repeated several times without additional heating, prior to opening of the reaction vessel in step (vi).

12. The method according to claim 1, wherein opening of the reaction vessel in step (vi) is controlled to depressurize the reaction vessel with a rate of 10-100 bar/min.

13. The method according to claim 1, wherein solid products present in the reaction vessel after step (vi) have a concentration of pentose in the range of 0-2 wt. %, with regard to the dry solid product.

14. The method according to claim 1, wherein solid products present in the reaction vessel after step (vi) have a rest moisture of about 30-95 wt. %.

15. The method according to claim 1, wherein the biomass material has a rest moisture of about 30-80 wt. %.

16. The method according to claim 1, wherein the pressure $p_1$ is maintained for a predetermined time span $t_1$.

17. The method according to claim 1, wherein the temperature $T_1$ is maintained for a predetermined time span $t_1$.

18. A method of producing furfural, comprising the steps of:
   (i) providing (a) biomass material and (b) oxygen or oxygen donors at a concentration of 0.01-0.50 mol $O_2$ or $O_2$ equivalents per kg of dried biomass material in a reaction vessel,
   (ii) adjusting the pressure in the reaction vessel to an elevated pressure $p_1$ and the temperature in the reaction vessel to an elevated temperature $T_1$, wherein the pressure $p_1$ is >1 bar, and the temperature $T_1$ ranges from 150° C. to 280° C., (iii) maintaining the pressure $p_1$ and/or the temperature $T_1$ for a predetermined time span $t_1$, wherein the predetermined time span $t_1$ is 500-700 s, (iv) adjusting the pressure in the reaction vessel to an elevated pressure $p_2$ and/or the temperature in the reaction vessel to an elevated temperature $T_2$, wherein adjusting the pressure in the reaction vessel to $p_2$ is performed with a rate of 1-15 bar/min, the pressure $p_2$ is in the range of from >1 to 50 bar, and the temperature $T_2$ ranges from 100° C. to 250° C., (v) optionally maintaining the pressure $p_2$ and/or the temperature $T_2$ for a predetermined time span $t_2$, wherein the pressure $p_1$ is higher than the pressure $p_2$, (vi) opening the reaction vessel, wherein opening of the reaction vessel in step (vi) is controlled to depressurize the reaction vessel with a rate of 40-100 bar/min, and (vii) optionally separating solid products from the reaction mixture present in the reaction vessel, wherein the furfural is produced in the presence of the oxygen or oxygen donors, and wherein a furfural containing vapor stream is withdrawn during steps (iii), (iv), (v) and/or (vi) and collected in the form of condensates.

19. The method according to claim 1, wherein the concentration of 0.01-0.50 mol $O_2$ or $O_2$ equivalents per kg of dried biomass material is maintained throughout step (iii) to sustain the reaction without requiring additional energy input.

20. The method according to claim 1, wherein maintaining the pressure $p_1$ and/or temperature $T_1$ for the predetermined time span $t_1$ in step (iii) results in at least a fivefold increase in furfural yield compared to a process omitting controlled oxygen introduction.

* * * * *